March 12, 1946. R. W. LUCE 2,396,588
NUT
Filed Sept. 24, 1941
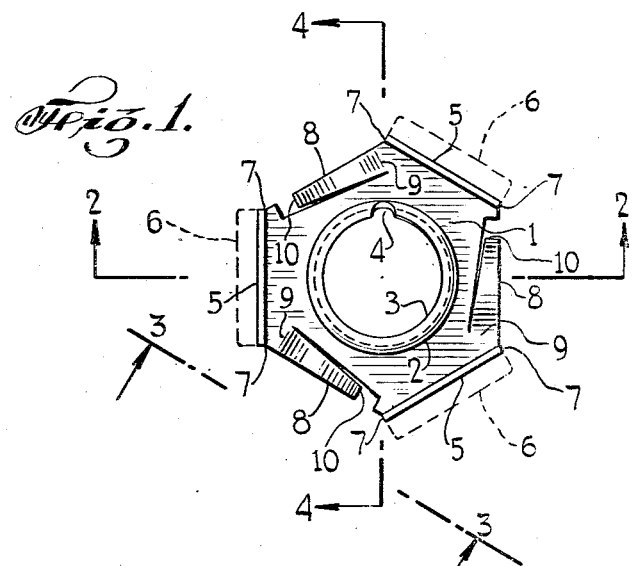
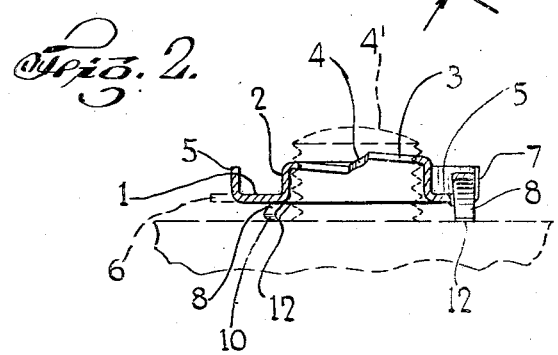
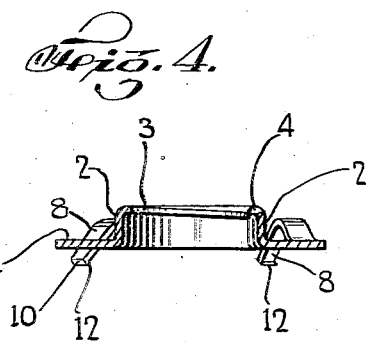
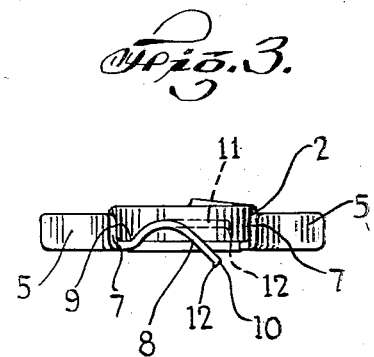

Patented Mar. 12, 1946

2,396,588

UNITED STATES PATENT OFFICE 2,396,588

NUT

Richard W. Luce, Southport, Conn.

Application September 24, 1941, Serial No. 412,077

1 Claim. (Cl. 151—37)

The invention herein disclosed relates to a nut and more particularly to a stamped, sheet metal nut.

An object of the invention is to provide a nut of this kind that is provided with the wrench engaging edges of a hexagonal nut but with a lesser number of sides. Another object of the invention is to provide a nut having a thread of a single convolution and having a lead-in for a bolt. A further object of the invention is to provide a nut of this kind having resilient elements for holding the nut against rotation on a bolt against forces resulting from vibration.

These and other objects and certain advantages that will hereinafter appear are realized in the nut, which constitutes one specific embodiment of the invention, illustrated in the accompanying drawing in which:

Fig. 1 is a plan of a nut;

Fig. 2 is a section of the same taken along the line 2—2 of Fig. 1;

Fig. 3 is side elevation of the same taken at the plane of the line 3—3 of Fig. 1; and Fig. 4 is a section of the same taken on the line 4—4 of Fig. 1.

The nut illustrated in the drawing is stamped from a single piece of sheet metal and includes a base or face portion 1 and a boss 2 extending from the face portion with the axis thereof perpendicular to the plane of the face portion. At the end of the boss, there is an inturned flange 3 which is notched at 4 and shaped to form one convolution of a helix of the requisite pitch for this particular size nut. The edge of this flange constitutes the thread of the nut. The internal diameter of the boss 2 is substantially the same as, slightly larger than, the over-all thread diameter of a bolt (indicated in broken lines 4' in Fig. 2) of a size to be received in the nut. This boss thus constitutes a lead-in for the bolt and directs the bolt for the proper engagement of the thread thereof with the single convolution thread of the nut. In this way the possibility of securing a cross-thread condition is minimized or substantially eliminated.

The face portion 2 has a hexagonal configuration and from alternate edges or sides of the hexagon, flanges 5 extend substantially perpendicular to the plane of the face portion. These flanges are formed as extensions of the face portion, indicated by the broken lines 6 (Fig. 1), when the blank for the nut is stamped. In the forming of the nut the flanges are bent to extend perpendicular to the face portion of the nut. These flanges provide wrench engaging edges equivalent to a hexagonal nut. These wrench engaging edges are indicated by the numeral 7. A monkey wrench, when applied to the nut will in every instance engage a face of a flange 5 which constitutes a wrench surface, and two of the edges 7. Thus, the torque for turning the nut may be applied to the nut. Likewise, as will be readily apparent the nut is suitable for the socket-type wrench.

By providing adequate wrench engagement in this manner with three flanges extending from alternate edges of the hexagonal face portion, the remainder of the face portion is available for resilient fingers 8, which act in the nature of a resilient lock washer when the nut is drawn home against a surface. Each of the fingers 8 is formed at an edge of the face portion intermediate two flanges. The fingers are struck from the face portion and the inner edge of each finger diverges from the free end thereof. In this way there is a diverging notch in which the finger is received. Each finger is bent as indicated (see Fig. 3) so that every portion of the finger in the notch is moved toward the large or secured end 9. Thus, the notch is, at all points, wider than the corresponding portion of the finger operating therein and the finger is free to bend without engaging or binding on the edge of the notch. The finger is also bent so that the free edge 10 thereof extends beyond the plane of the face portion of the nut.

Preferably, the fingers 8 are struck from the face portion upwardly, as indicated by the broken lines 11 in Fig. 3. When a finger is thus struck or sheared a burr 12 is formed on the edge thereof. This burr when formed so as to extend as shown in Fig. 3, serves a useful purpose. When the nut is drawn home against an abutting surface, the burr tends to dig into the engaging surface and so adds to the resilient action of the fingers to prevent the nut from loosening on a bolt.

This nut is desirably produced from heat treatable steel and when finished the nut is heat treated. There is, of course, no tapping operation necessary as the single convolution thread is formed in the stamping.

From the foregoing description of the embodiment of the invention illustrated in the drawing, it will be seen that by this invention there is provided a stamped sheet metal nut having a thread of a single convolution and in which there are provided a lead-in, hexagonal wrench engaging surfaces and resilient fingers, all without the necessity of making the nut materially oversized.

It will be obvious that various changes may be made by those skilled in the art in the details of the embodiment of the invention illustrated in the drawing and described in detail above within the principle and scope of the invention as expressed in the appended claim.

I claim:

A nut of the kind described consisting of a single piece of sheet metal and including a face portion of hexagonal configuration, a hollow boss extending from the face portion and having an internal diameter substantially the same as the over-all thread diameter of a bolt of a size to be received in the nut, an inwardly extending flange at the end of the boss forming the thread of the nut, flanges extending perpendicular to the face of the nut from alternate edges thereof, and spaced, resilient fingers formed in the face portion at the edges thereof between the said perpendicular flanges, each of the fingers, having a diverging inner edge and being bent to move the end thereof away from the adjacent face portion and to cause the finger to extend beyond the plane of the face portion.

RICHARD W. LUCE.